(12) United States Patent
Beristany et al.

(10) Patent No.: US 12,374,874 B2
(45) Date of Patent: Jul. 29, 2025

(54) ELECTRICAL BOX AND CONDUIT SUPPORT PLATES

(71) Applicant: Hubbell Incorporated, Shelton, CT (US)

(72) Inventors: Victor Beristany, Mishawaka, IN (US); Steven James Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/499,815

(22) Filed: Nov. 1, 2023

(65) Prior Publication Data

US 2024/0063620 A1   Feb. 22, 2024

Related U.S. Application Data

(63) Continuation of application No. 17/145,741, filed on Jan. 11, 2021, now Pat. No. 11,837,859.

(Continued)

(51) Int. Cl.
*H02G 3/18*    (2006.01)

(52) U.S. Cl.
CPC ..................... *H02G 3/18* (2013.01)

(58) Field of Classification Search
CPC ............ H02G 3/123; H02G 3/18; H02G 3/20; H02G 3/263; H02G 3/32; H02G 3/34;

(Continued)

(56) References Cited

U.S. PATENT DOCUMENTS

D449,218 S    10/2001  Vrame
D462,939 S     9/2002  Dinh
(Continued)

FOREIGN PATENT DOCUMENTS

CA    2577641    8/2007
CA    2578456    8/2007
(Continued)

OTHER PUBLICATIONS

SP Products, Grid-Systems Box Support Plate Flyer, Jul. 1, 2018 (1 pg).

(Continued)

*Primary Examiner* — Timothy J Thompson
*Assistant Examiner* — Guillermo J Egoavil
(74) *Attorney, Agent, or Firm* — Wissing Miller LLP

(57) ABSTRACT

The present disclosure provides improved electrical box and conduit support plates that allow for central mounting of an electrical box to a support plate and mounting of electrical conduits for suspended installations in various orientations. The support plate includes a body having a plurality of built-in offsets, a plurality of built-in hanger tabs, and a plurality of clip mounting apertures that may be arranged as pairs. Each built-in offset preferably has two side walls extending from the body and a mounting arm between the side walls. Each mounting arm includes a plurality of clamp mounting apertures used to attach a conduit clamp to the mounting arm. Each of the plurality of built-in hanger tabs are preferably bendable relative to the body. Box and conduit support kits that includes a body and a plurality of hanger clips are also provided.

22 Claims, 12 Drawing Sheets

Related U.S. Application Data

(60) Provisional application No. 62/959,492, filed on Jan. 10, 2020.

(58) Field of Classification Search
CPC .......... H02G 3/381; H02G 3/081; F16L 3/08; Y10T 29/49826
USPC ................ 174/50, 135; 361/829; 29/428; 248/225.11, 73
See application file for complete search history.

(56) References Cited

U.S. PATENT DOCUMENTS

| | | |
|---|---|---|
| 6,491,270 B1 * | 12/2002 | Pfaller ............... H02G 3/125 248/200.1 |
| D531,010 S | 10/2006 | Vrame |
| 7,300,025 B2 | 11/2007 | Korcz |
| 7,439,443 B2 | 10/2008 | Dinh |
| 7,472,875 B2 | 6/2009 | Rinderer |
| 7,699,283 B2 | 4/2010 | Vrame et al. |
| 7,798,458 B2 | 9/2010 | Borbolla et al. |
| 8,047,491 B2 | 11/2011 | Gutierrez |
| 8,261,926 B2 | 9/2012 | Bradley et al. |
| 8,403,289 B1 | 3/2013 | Rinderer |
| 8,424,827 B2 | 4/2013 | Dinh |
| D698,737 S | 2/2014 | Hagarty |
| D722,029 S | 2/2015 | Hagarty |
| D731,292 S | 6/2015 | Vrame |
| D745,466 S | 12/2015 | Hagarty |
| D756,750 S | 5/2016 | Vrame et al. |
| 9,337,635 B2 | 5/2016 | Korcz et al. |
| 9,568,123 B2 | 2/2017 | Zhang et al. |
| 9,667,047 B1 | 5/2017 | Vrame |
| 9,667,050 B1 | 5/2017 | Vrame |
| D804,934 S | 12/2017 | Vrame |
| 2003/0029983 A1 | 2/2003 | Pfaller |
| 2009/0173865 A1 | 7/2009 | Vrame et al. |
| 2010/0155105 A1 * | 6/2010 | Dinh ............... H02G 3/081 361/826 |
| 2014/0150218 A1 | 6/2014 | Colangelo et al. |
| 2015/0226375 A1 | 8/2015 | Zhang |
| 2017/0093140 A1 | 3/2017 | Nikayin et al. |

FOREIGN PATENT DOCUMENTS

| | | |
|---|---|---|
| CA | 2585409 | 10/2008 |
| KR | 100765055 B1 | 8/1967 |

OTHER PUBLICATIONS

SP Products, 8-Way Conduit & Box Support Plates with Split Fingers Flyer, Jul. 1, 2018 (1 pg).
SP Products, Universal Round Conduit & Box Support Plate Flyer, Mar. 1, 2020 (1 pg).
SP Products, 4-Way Conduit & Box Support Plates, Sep. 1, 2019 (1 pg).
International Search Report and Written Opinion mailed on Apr. 6, 2021 in corresponding International Application No. PCT/US2021/12915.
International Preliminary Report on Patentability mailed in corresponding PCT/US2021/012915 on Jul. 21, 2022 (8 pages).

* cited by examiner

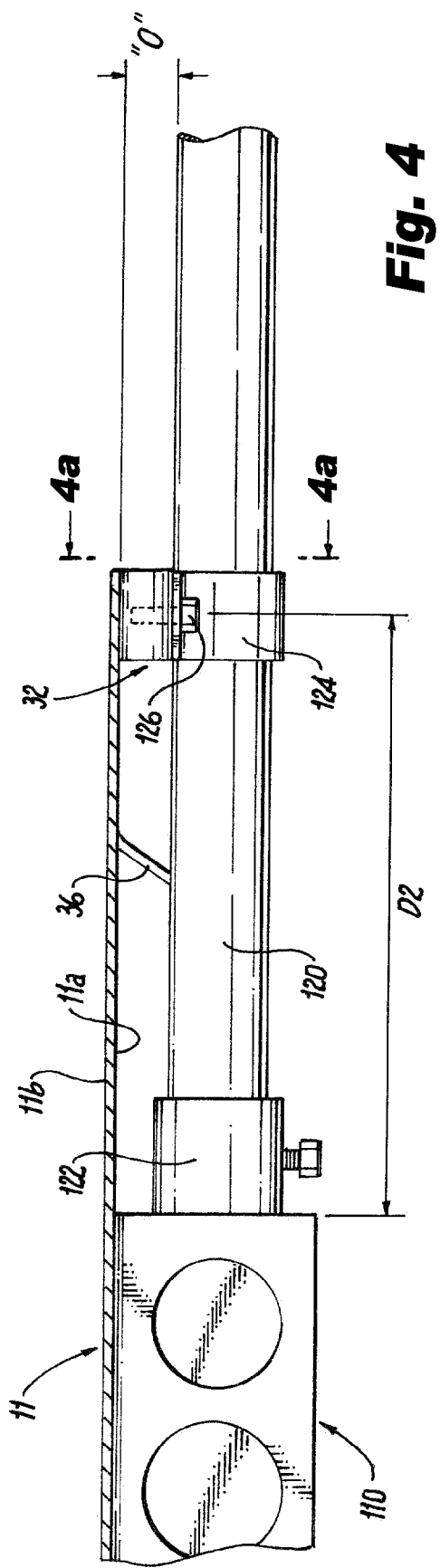
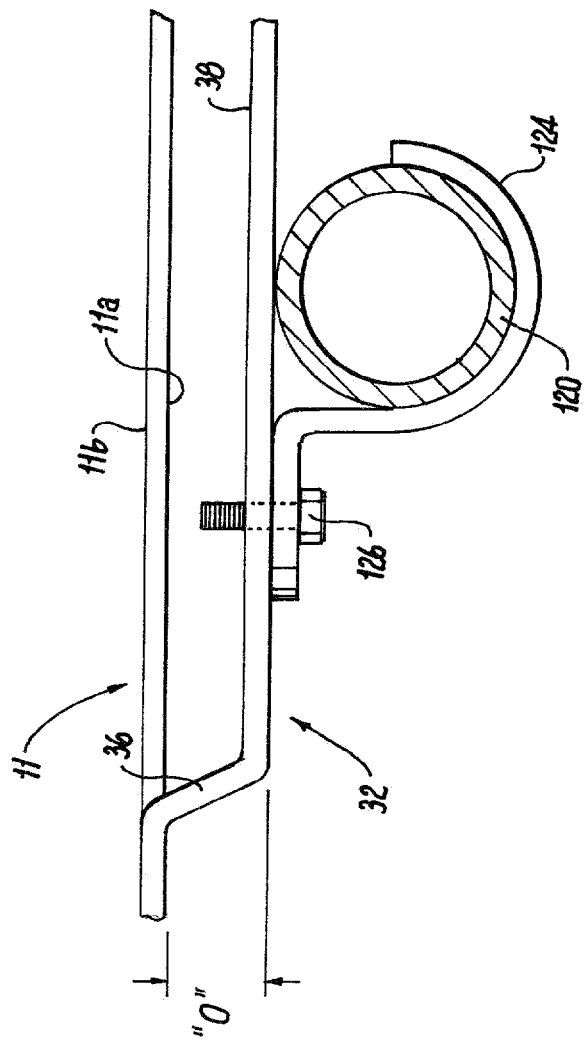

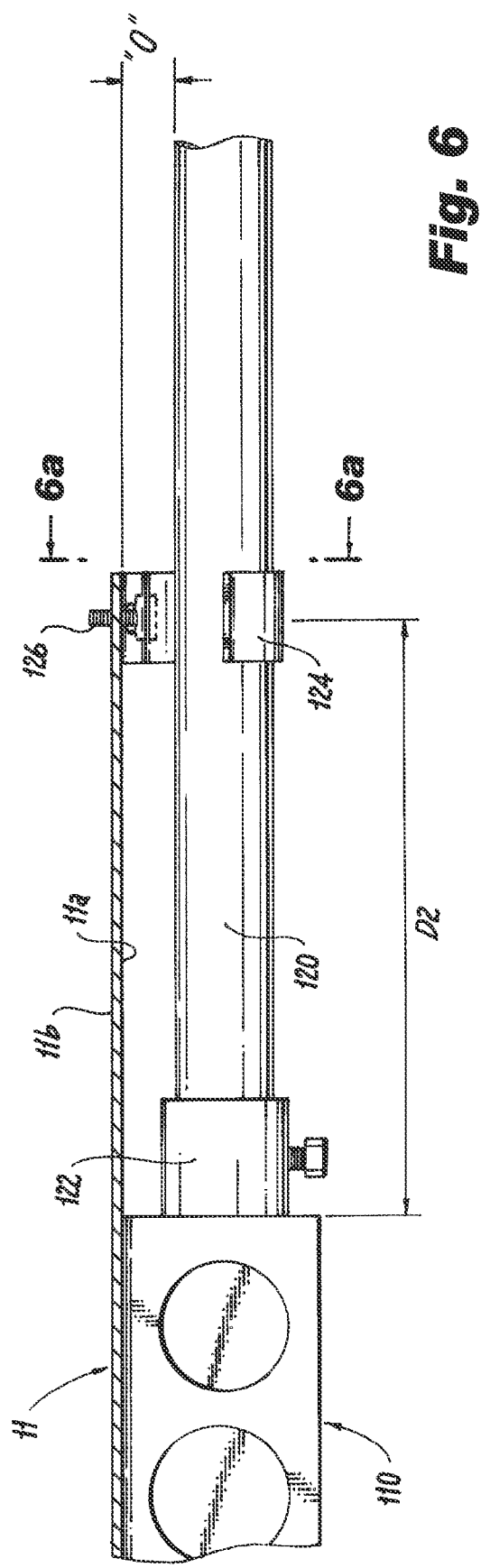
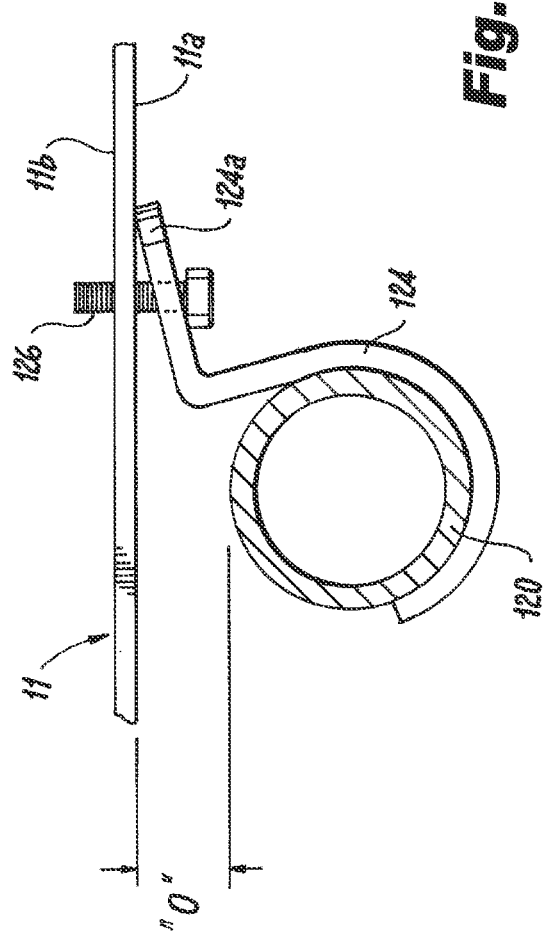
Fig. 6
Fig. 6a

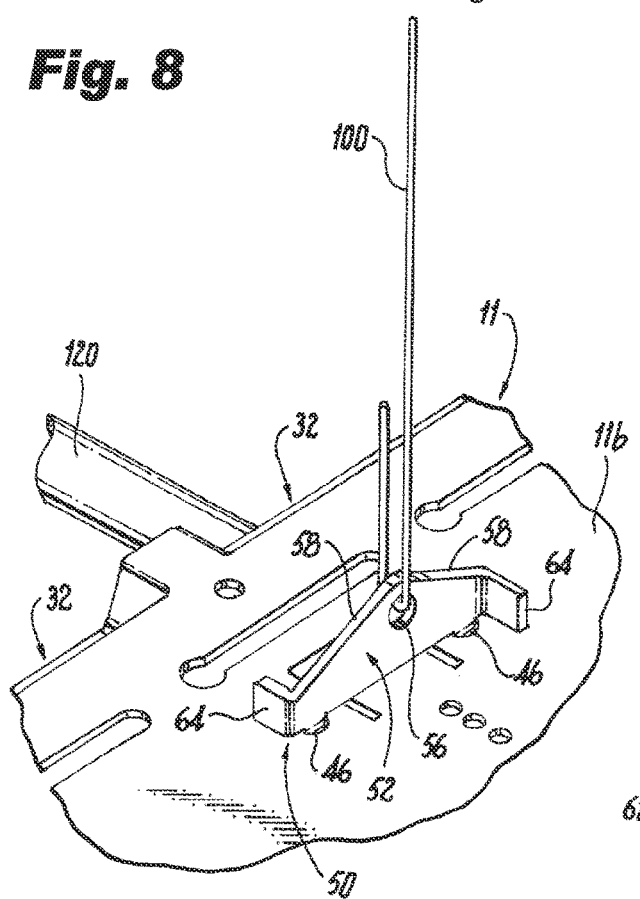
Fig. 8
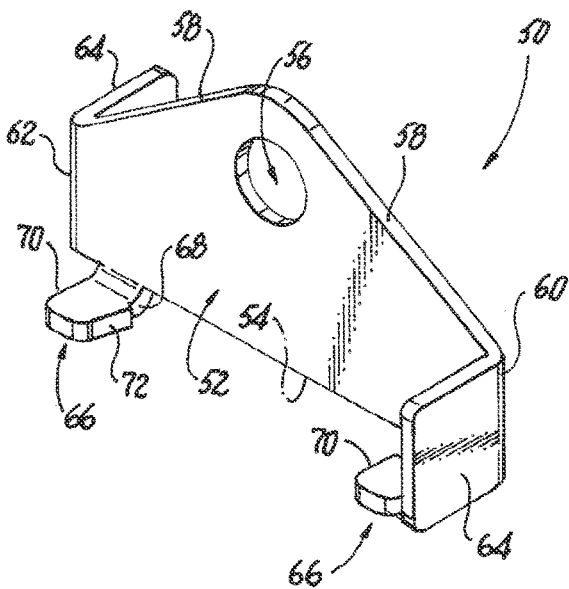
Fig. 9
Fig. 10

ELECTRICAL BOX AND CONDUIT SUPPORT PLATES

CROSS-REFERENCE TO RELATED APPLICATIONS

The present application is a continuation of co-pending U.S. application Ser. No. 17/145,741 filed Jan. 11, 2021, which is based on and claims benefit from U.S. Provisional Patent Application Ser. No. 62/959,492 filed on Jan. 10, 2020 the contents of both are incorporated herein in their entirety by reference.

BACKGROUND

Field

The present disclosure relates generally to electrical box and conduit support plates. More particularly, the present disclosure relates to electrical box and conduit support plates that provide various options for hanging the support plates from a structure in different orientations and that include built-in offsets for conduit attachment.

Description of the Related Art

When installing wiring in a building, electrical junction boxes and conduits are typically used to route and protect electrical wiring. National and/or local electrical codes require both the electrical boxes and the conduits be adequately mounted to a structure or support to resist movement. In some instances, electrical junction boxes are suspended from a ceiling using anchored rods and electrical conduits are connected to the suspended electrical junction boxes. National and local electrical codes require conduits connected to such electrical junction boxes to be sufficiently supported within a specified spacing of the connection to the electrical junction boxes, e.g., within about 36 inches of the electrical junction boxes. Electrical conduits are supported to structures using various types of conduit clamps, including one-hole and two-hole conduit straps.

The present disclosure provides improvements to box and conduit support plates that can be suspended from a ceiling or other structure in various orientations using one of various mounting assemblies and that includes include built-in offsets that allow electrical conduits to be secured to the box and conduit support plates within the spacing requirements set forth in national and/or local electrical codes.

SUMMARY

The present disclosure provides exemplary embodiments of improved, one-piece electrical box and conduit support plates for an electrical box and one or more electrical conduits connected to the electrical box. The one-piece electrical box and conduit support plates facilitate efficient installation of electrical boxes and electrical conducts, and permit efficient orientation of the one-piece electrical box and conduit support plates to accommodate various orientations needed or desired for the electrical boxes and electrical conduits the electrical box and conduit support plates are to support. The present disclosure also provides exemplary embodiments box and conduit support kits.

In an exemplary embodiment, the one-piece support plate includes a body having a plurality of built-in offsets, a plurality of built-in hanger tabs, and a plurality of clip mounting apertures that may be arranged as pairs. Each built-in offset preferably has two side walls extending from the body and a mounting arm between the side walls. Each mounting arm includes a plurality of clamp mounting apertures used to attach a conduit clamp to the mounting arm. Each of the plurality of built-in hanger tabs are preferably bendable relative to the body.

In another exemplary embodiment, the one-piece support plate includes a body, a plurality of built-in offsets, a plurality of built-in hanger tabs and at least one pair of clip mounting apertures. The body has a front face, a rear face, a box mounting portion and a conduit mounting portion. The plurality of built-in offsets are positioned in the conduit mounting portion of the body and extending away from the front face of the body. Each of the plurality of built-in offsets has a pair of spaced apart side walls extending from the body and a mounting arm positioned between the pair of side walls. Each of the side walls may extend substantially perpendicular from the body or at an angle relative to the body, and the mounting arm may include a plurality of clamp mounting apertures. The plurality of built-in hanger tabs are positioned in the conduit mounting portion of the body. Each of the plurality of built-in hanger tabs are bendable relative to the body. Each of the plurality of built-in hanger tabs may include a center aperture used to secure a hanging member to the body. The at least one pair of clip mounting apertures is positioned in the conduit mounting portion of the body.

In another exemplary embodiment, the one-piece support plate includes a body, a plurality of built-in offsets, a plurality of built-in hanger tabs and at least one pair of clip mounting apertures. The body has a front face, a rear face, a box mounting portion and a conduit mounting portion. The plurality of built-in offsets are positioned in the conduit mounting portion of the body and extending away from the front face of the body. Each of the plurality of built-in offsets has a pair of spaced apart side walls extending from the body and a mounting arm positioned between the pair of side walls and spaced away from the body. Each of the side walls may extend substantially perpendicular from the body or at an angle relative to the body, and the mounting arm may include a plurality of clamp mounting apertures. The plurality of built-in hanger tabs are positioned in the conduit mounting portion of the body. Each of the plurality of built-in hanger tabs is preferably bendable relative to the body. Each of the plurality of built-in hanger tabs may include a center aperture used to secure a hanging member to the body. The at least one pair of clip mounting apertures is positioned in the conduit mounting portion of the body.

In an exemplary embodiment, the box and conduit support kit includes a body and a plurality of hanger clips. The body has a plurality of built-in offsets, a plurality of built-in hanger tabs, and a plurality of clip mounting apertures that may be arranged as pairs. Each built-in offset preferably has two side walls extending from the body and a mounting arm between the side walls. Each mounting arm includes a plurality of clamp mounting apertures used to attach a conduit clamp to the mounting arm. Each of the plurality of built-in hanger tabs are preferably bendable relative to the body. Each of the plurality of hanger clips includes a clip body having a first side and a second side that is opposite the first side, at least one stabilizing tab extending from either the first side or the second side, and at least one coupling tab extending from a bottom edge of the body. The at least one coupling tab is capable of coupling with at least one of the plurality of clip mounting apertures.

In another exemplary embodiment, the box and conduit support kit includes an electrical box and conduit support plate and a plurality of hanger clips. The electrical box and conduit support plate includes a body, a plurality of built-in offsets, a plurality of built-in hanger tabs and at least one pair of clip mounting apertures. The body has a front face, a rear face, a box mounting portion and a conduit mounting portion. The plurality of built-in offsets are positioned in the conduit mounting portion of the body and extending away from the front face of the body. Each of the plurality of built-in offsets has a pair of spaced apart side walls extending from the body and a mounting arm positioned between the pair of side walls. Each of the side walls may extend substantially perpendicular from the body or at an angle relative to the body, and the mounting arm may include a plurality of clamp mounting apertures. The plurality of built-in hanger tabs are positioned in the conduit mounting portion of the body. Each of the plurality of built-in hanger tabs are bendable relative to the body. Each of the plurality of built-in hanger tabs may include a center aperture used to secure a hanging member to the body. The at least one pair of clip mounting apertures is positioned in the conduit mounting portion of the body.

Each of the plurality of hanger clips has a body with a first side and a second side that is opposite the first side, at least one stabilizing tab extending from either the first side or the second side of the body, and at least one pair of coupling tabs extending from a bottom edge of the body. The at least one pair of coupling tabs is configured to couple with the at least one pair of clip mounting apertures.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 is a cross-sectional view of the electrical box and conduit support plate of FIG. 1 taken from line 4-4, illustrating the electrical junction box attached to the electrical box and conduit support plate and an electrical conduit connected to the electrical junction box and secured to the electrical box and conduit support plate using a conduit strap attached to a built-in offset of the electrical box and conduit support plate;

FIG. 4a is an enlarged side elevation view of the electrical conduit secured to the electrical box and conduit support plate of FIG. 4 taken from line 4a-4a, illustrating a base of the conduit strap secured to the built-in offset with a fastener and flush with the built-in offset;

FIG. 6 is a cross-sectional view of the electrical box and conduit support plate of FIG. 5 taken from line 6-6, illustrating the electrical junction box attached to the electrical box and conduit support plate and an electrical conduit connected to the electrical junction box and secured to the electrical box and conduit support plate using a conduit strap;

FIG. 6a is an enlarged side elevation view of the electrical conduit secured to the box and conduit support plate of FIG. 6 taken from line 6a-6a, illustrating a base of the conduit strap secured to the box and conduit support plate and offset from the electrical box and conduit support plate;

FIG. 8 is a perspective view of a portion of the rear face of the electrical box and conduit support plate of FIG. 2, illustrating a removable hanger clip coupled to the electrical box and conduit support plate with a hanger wire extending from the hanger clip used to suspend the electrical box and conduit support plate from a ceiling in a horizontal orientation;

FIG. 9 is a perspective view of an exemplary embodiment of a hanger clip according to the present disclosure;

FIG. 10 is a bottom plan view of the hanger clip of FIG. 9;

DETAILED DESCRIPTION

Figure 1:
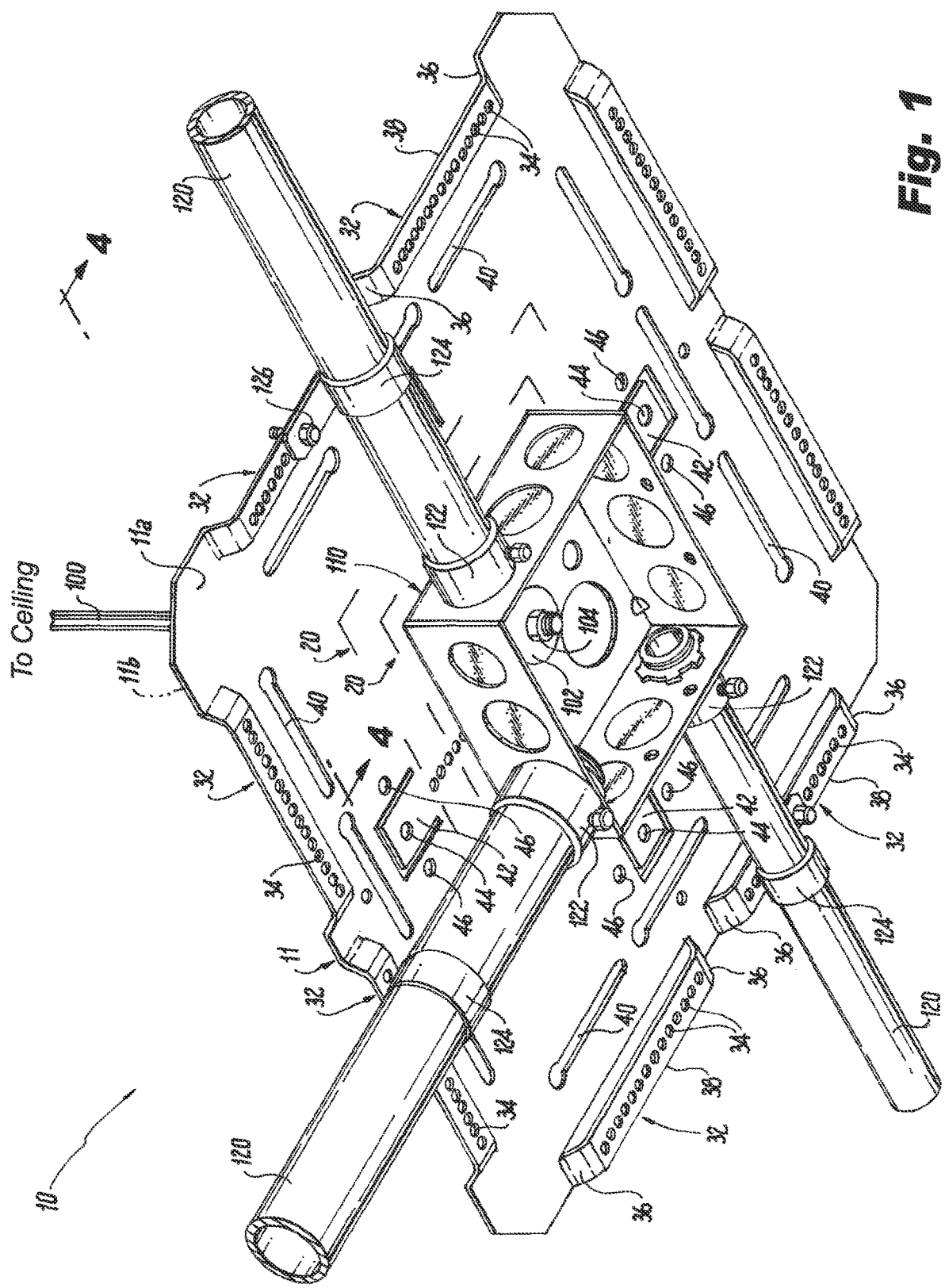
FIG. 1 is a perspective view of an exemplary embodiment of an electrical box and conduit support plate according to the present disclosure suspended from a ceiling in a horizontal orientation using a threaded rod, with an electrical junction box secured to the electrical box and conduit support plate and multiple conduits connected to the electrical box and secured to built-in offsets of the electrical box and conduit support plate.

The present disclosure provides exemplary embodiments of improved, one-piece electrical box and conduit support plates for supporting an electrical box and securing one or more electrical conduits connected to the electrical box within a predefined spacing from the electrical box. The electrical box and conduit support plates are intended to be suspended from a structure. Examples of such structures include ceilings, roofs, rafters, trusses and joists. One or more hanging members are used to suspend the electrical box and conduit support plates from the structure. The electrical box and conduit support plates can be installed in different orientations to conform to the desired or required orientation of the boxes and conduits to be supported by the electrical box and conduit support plates. Examples of such hanging members include threaded rods or studs, steel cables or wires, or other devices capable of suspending the electrical box and conduit support plates from the structure. For ease of description, the electrical box and support plates may also be referred to herein as the "support plates" in the plural and the "support plate" in the singular. The hanging members may be referenced herein as the "hanging members" in the plural and the "hanging member" in the singular. The electrical boxes may also be referred to herein as the "boxes" in the plural and the "box" in the singular. The electrical conduits may also be referred to herein as the "conduits" in the plural and the "conduit" in the singular.

Referring to the figures, exemplary embodiments of support plates according to the present disclosure are shown. In the exemplary embodiments shown, the support plates are configured so that they can be oriented in various orientations, e.g., horizontal and vertical orientations, relative to the structure the support plate is being suspended from. For example, in the embodiments of FIGS. 1-8, the support plate 10 is in a horizontal orientation relative to a ceiling, and in the embodiments of FIGS. 11-14, the support plate 10 is in a vertical orientation relative to the ceiling. However, the present disclosure also contemplates that the support plates can be oriented at any angle relative to the structure the support plate is being suspended from.

Referring to FIGS. 1-4a, the support plate 10 includes for general reference a body 11 having a box mounting portion 12 and a conduit mounting portion 30. The box mounting portion 12 is an area of the support plate 10 where the box 110 is to be secured to the support plate using for example fasteners 112, seen in FIG. 7. The conduit mounting portion 30 is an area of the support plate 10 where conduits 120 are to be mounted and where hanging members 100, used to suspend the support plate from a structure, are attached to the support plate 10. In the embodiment shown, the support plate 10 is a square-shape member. However, the present disclosure contemplates support plates 10 that may come in many different symmetrical or asymmetrical shapes, including rectangular, hexagonal, octagonal, and circular shapes. The support plate 10 is made of a rigid material sufficient to be suspended from a structure and to permit a box and multiple conduits to be secured thereto with nominal bending of the support plate or preferably with no bending of the support plate. Non-limiting examples of such rigid materials include steel, aluminum and aluminum alloys.

Continuing to refer to FIGS. 1-4a, the box mounting portion 12 is a substantially flat portion of the support plate 10 and includes one or more conduit openings 14, one or more box mounting apertures 16 and central opening 18 used for attaching the hanging member 100 to the and the box 110 and the support plate 10 when suspending the support plate 10 from a structure. The conduit openings 14 are oversized openings that permit a conduit connector 122 and a conduit 120 to pass through. As a non-limiting example, the conduit openings 14 may be greater than about ½ an inch in size. The one or more box mounting apertures 16 can be used to attach a box 110 to the support plate using fasteners 112, seen in FIG. 7. The central opening 18 can be used for attaching the hanging member 100 to the box 110 and support plate 10 when suspending the support plate 10 from a structure. As shown in FIG. 1, with the hanging member 100 being a threaded rod, a washer 102 and nut 104 can be used to attach the threaded rod 100 to the box 110 and support plate 10. The box mounting portion 12 of the body 11 may also include indicia 20 on a front face 11a and/or a rear face 11b of the body 11. The indicia 20 can be used to facilitate the centering of the box 110 within the box mounting portion 12. In the embodiment shown in FIG. 2, the indicia 20 includes three sets of solid and/or dashed lines in the shape of three separate square outlines 20a, 20b and 20c, each representing an approximate outline of different size boxes 110 that can be secured to the support plate 10. It is noted that the solid line 20a in FIG. 2 also denotes the end of the box mounting portion 12.

Figure 2:
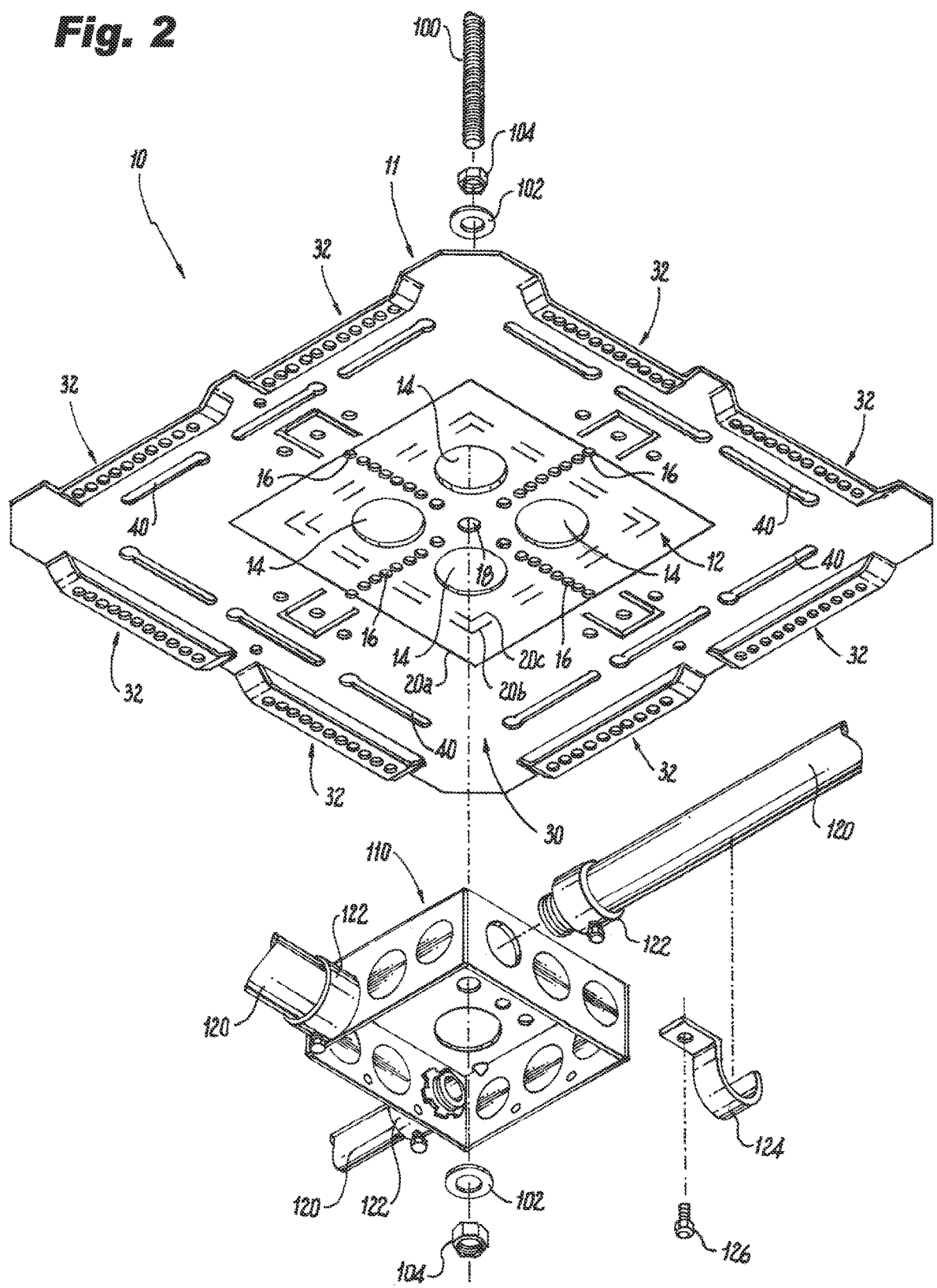
FIG. 2 is an exploded perspective view of the electrical box and conduit support plate of FIG. 1, illustrating the threaded rod, a front face of the box and conduit support plate, the electrical junction box and multiple conduits.
Figure 3:
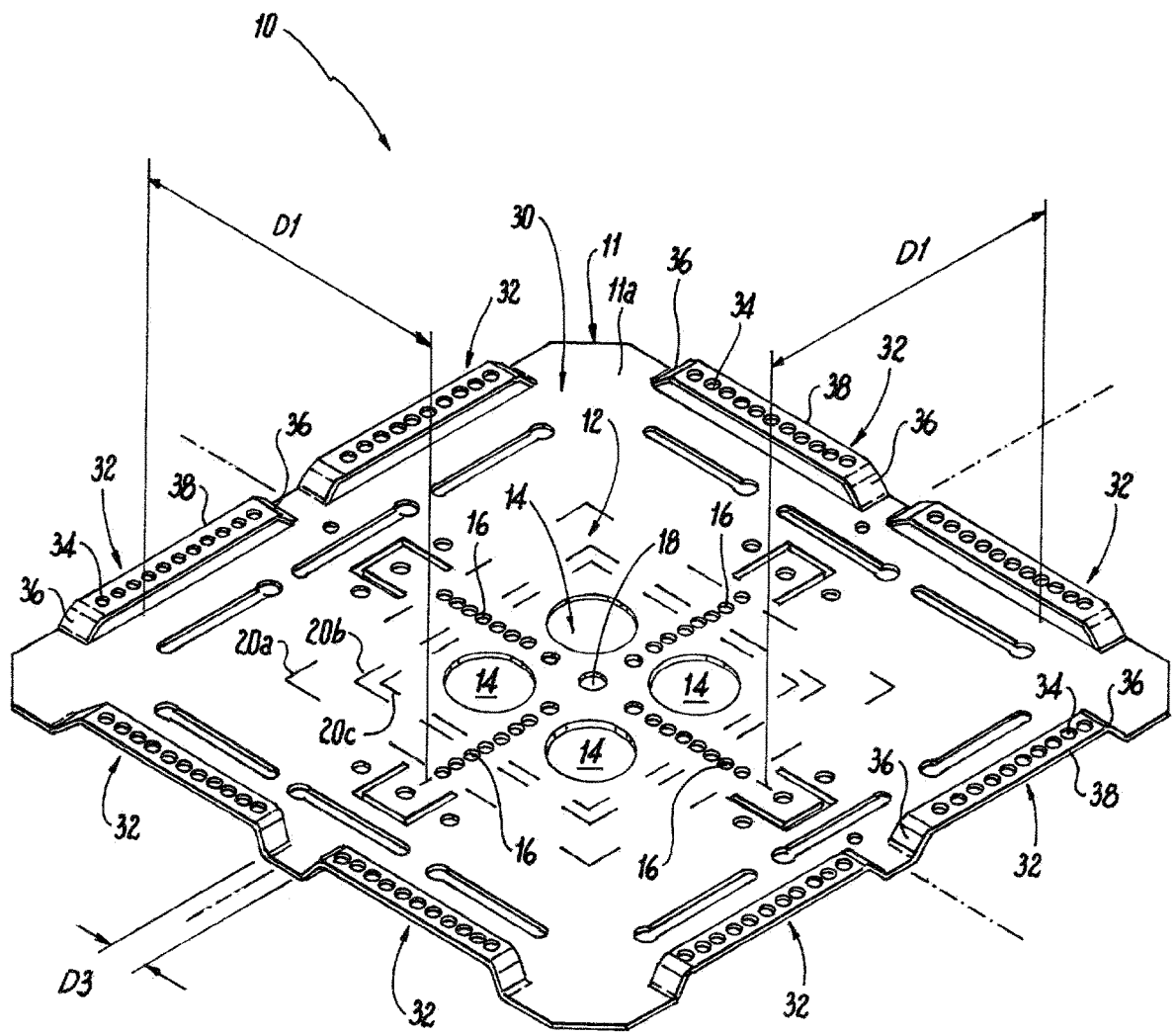
FIG. 3 is a perspective view of the electrical box and conduit support plate of FIG. 2.
Figure 5:
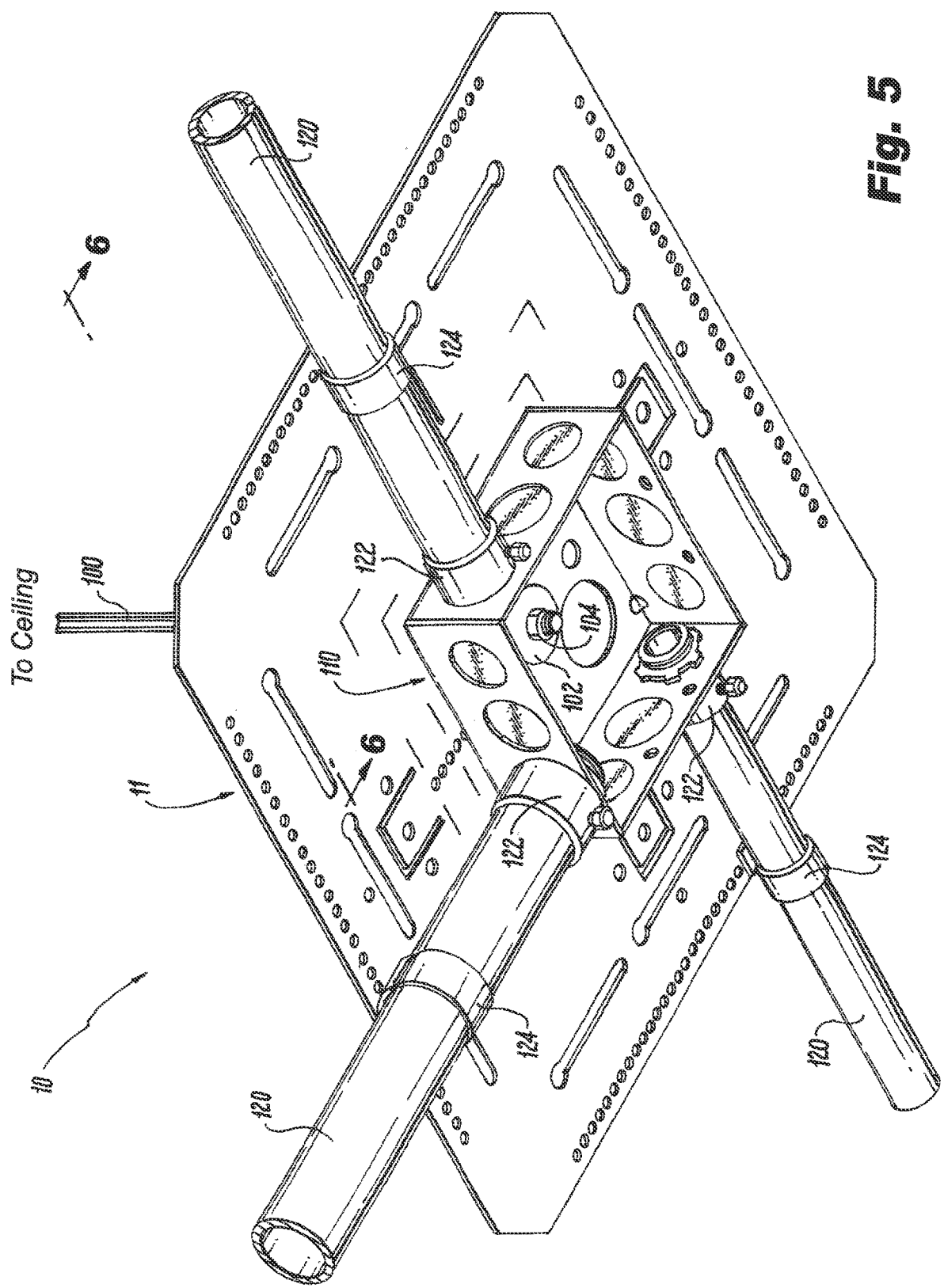
FIG. 5 is a perspective view of another exemplary embodiment of an electrical box and conduit support plate according to the present disclosure suspended from a ceiling in a horizontal orientation using a threaded rod and supporting an electrical junction box and multiple conduits.
Figure 7:
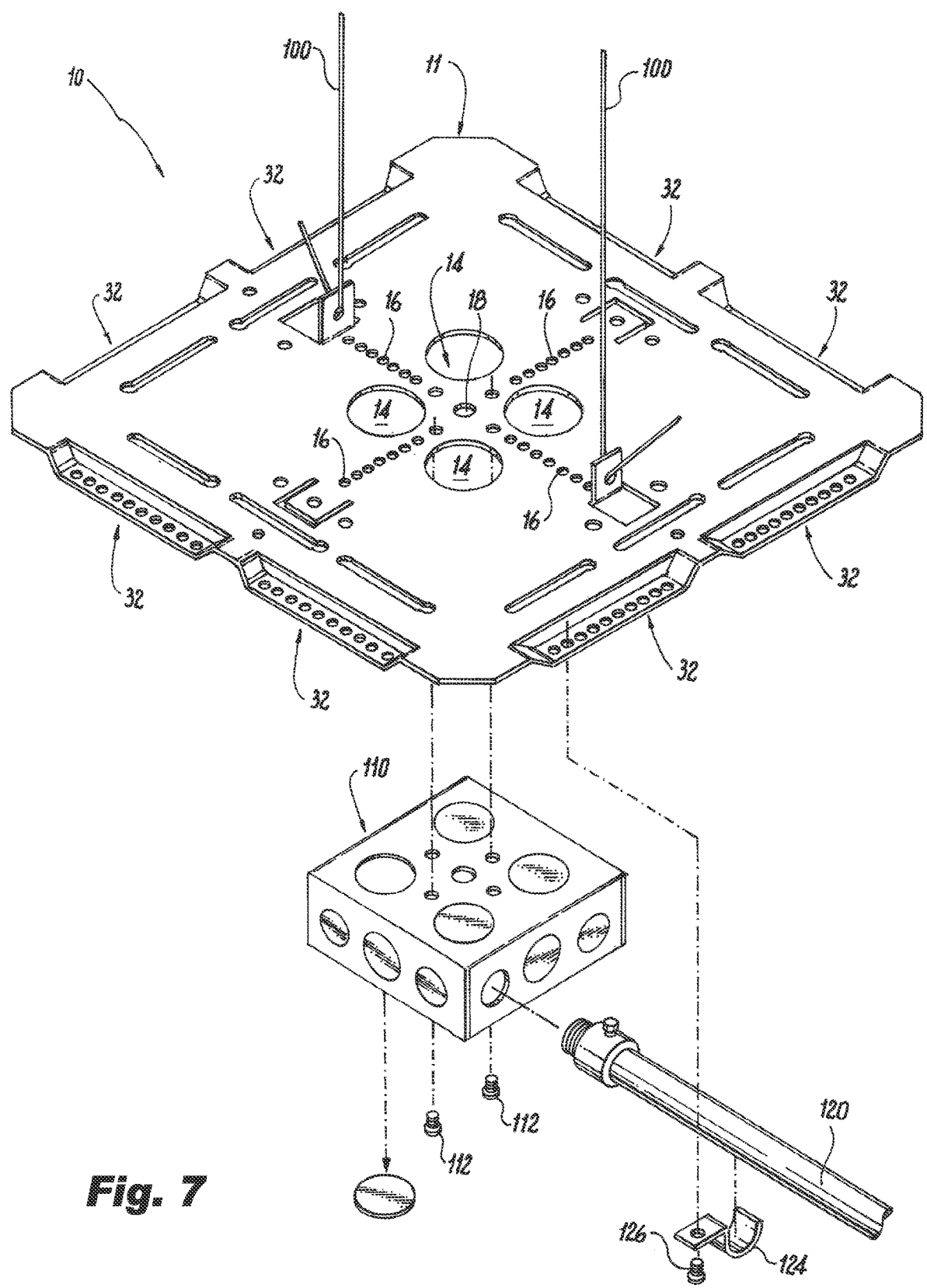
FIG. 7 is a perspective view of a rear face of the electrical box and conduit support plate of FIG. 2, illustrating built in hanger tabs bent away from the rear face of the electrical box and conduit support plate and hanger wires extending from the hanger tabs used to suspend the electrical box and conduit support plate from a ceiling in a horizontal orientation.

In the exemplary embodiment shown, the conduit mounting portion 30 begins at the outer edge of the box mounting portion 12 and ends at an outer perimeter of the support plate 10, as shown in FIGS. 1 and 2. The conduit mounting portion 30 includes one or more built-in offsets 32 positioned in close proximity to the outer perimeter of the support plate 10. The built-in offsets 32 provide a predefined offset distance "O," seen in FIGS. 4 and 4a, from the front face 11a of the body 11 of the support plate 10 so that a conduit 120 connected to the box 110 can rest against the built-in offset 32, as shown in FIGS. 4 and 4a. The built-in offsets 32 are also known as lances and may also be referred to herein as "lances" in the plural and "lance" in the singular. Each of the one or more built-in offsets 32 can include a raised surface having side walls 36 and a mounting arm 38 between the side walls. The side walls 36 may be substantially perpendicular to the body 11 or the side walls 36 may be at an angle relative to the body 11. In the exemplary embodiment shown, the side walls 36 are at an angle relative to the body 11. The mounting arm 38 shown is configured and dimensioned to be substantially flat and substantially straight, as shown in FIGS. 1 and 2. However, the mounting arm 38 may be in other configurations that conform to the shape of the support plate 10. For example, in instances where the support plate 10 is a round plate, the mounting arm 38 may have an arcuate shape that conforms to the shape of the circular support plate. In the embodiment shown, the mounting arm 38 includes one or more clamp mounting apertures 34, seen in FIGS. 1 and 2, that can be used to secure one or more conduit clamps 124, e.g., one-hole and two-hole conduit straps, to the one or more built-in offsets 32 using a fastener 126, such as a sheet metal screw. The one or more built-in offsets 32 are positioned in close proximity to the outer perimeter of the support plate 10 a predefined distance "D1," seen in FIG. 3, from center lines of the support plate 10 intersecting the central opening 18. The predefined distance "D1" is set so that a distance between outer walls of the smallest box 110 recommended for securing to the support plate 10 and the built-in offsets 32 allows the conduit clamps 124, seen in FIG. 1, to be secured to the built-in offsets 32 within national and/or local electrical code distance requirement "D2," seen in FIGS. 4 and 6. As a non-limiting example, the predefined distance "D1" may range from about 4 inches to about 10 inches, and the distance "D2" may range from about 2 inches to about 8 inches. In the embodiment shown, there are two spaced built-in offsets 32 on each side of the square-shaped support plate 10. The built-in offsets 32 on each side of the support plate 10 are spaced apart a predefined distance "D3." As a non-limiting example, the predefined distance "D3" may range from about ½ inch to about 2 inches. While the embodiments shown have two spaced apart built-in offsets 32 on each side of the square-shaped support plate 10, the present disclosure contemplates that a single built-in offset 32 may be positioned on each side of the square-shaped support plate 10, or that more than two built-in offsets 32 may be positioned on each side of the square-shaped support plate 10. The present disclosure also contemplates that one or more built-in offsets 32 may be positioned on less that all sides of the support plate 10. It is noted that the embodiment of FIGS. 5-6a, is substantially the same as the embodiment of FIGS. 1-4a, except that the support plate 10 does not include the one or more built-in offsets 32. As a result, when the conduit clamp 124 is secured to the support plate using a fastener 126, the base 124a of the conduit clamp 124 may be angled as shown in FIGS. 6 and 6a to make up the predefined distance "O."

Continuing to refer to FIGS. 1-4a, the conduit mounting portion 30 may also include one or more mounting slots 40 positioned, for example, between the built-in offsets 32 and the box mounting portion 12. The one or more mounting slots 40 are provided to adjust the positioning of the conduit clamps 124 when securing the conduit clamps and a conduit 120 to the support plate 10. In the exemplary embodiment shown, each mounting slot 40 is a keyhole slot, however, other shape slots may be substituted for the keyhole slot. The conduit mounting portion 30 may also include one or more built-in hanger tabs 42, seen in FIG. 1, that may be flush with the support plate 10 when fabricated and then bent in the direction of, for example, the rear face 11b of the body 11 of the support plate 10. Each of the one or more hanger tabs 42 includes a center aperture 44 that facilitates connection of the hanger tab 42 to a hanging member 100 used to suspend the support plate 10 from the structure. In the exemplary embodiment shown in FIG. 7, the hanging member 100 is a steel wire that is passed through the center aperture 44 in the hanger tab 42 and bent back to hold the support plate 10. In the exemplary embodiment shown in FIGS. 11-14, the hanging member 100 is a threaded rod that passes through the center aperture 44 in the hanger tab 42 and is secured to the hanger tab using washers 43 and nuts 45, as shown in FIG. 14.

The conduit mounting portion 30 may also include clip mounting apertures 46, seen in FIG. 1, positioned to receive a hanger clip 50, seen in FIGS. 8-10. The hanger clip 50 has a body 52 with a straight bottom edge 54 for contacting the rear face 11b of the body 11 of the support plate 10. The body 52 has a substantially flat, planar configuration, and includes an aperture 56 or other coupling member for receiving a hanging member 100 used to suspend the support plate 10 from a structure. The body 52 may also include inclined top edges 58 that converge to an apex at or near a vertical center line of the body 52. In other embodiments, the top edge 58 can be straight and substantially parallel to the bottom edge 54. The body 52 has a first side 60 and a second side 62 that is opposite the first side 60. In the exemplary embodiment shown, the sides 60 and 62 extend between the bottom edge 54 and the top edge 58 of the body 52. The sides 60 and 62 extend substantially perpendicular to the bottom edge 54. In other embodiments, the sides 60 and 62 may be angled or inclined with respect to the bottom edge 54. A stabilizing tab 64 may extend from one or both of the sides 60 and/or 62 of the body 52. In the embodiment shown, a stabilizing tab 64 extends from the first side 60 and a stabilizing tab 64 extends from the second side 62. Each stabilizing tab 64 has a height and a width sufficient to support and stabilize the hanger clip 50 with respect to the support plate 10 at least when the support plate 10 is suspended from a structure. For example, the stabilizing tab 64 may have a height corresponding substantially to a height of the respective side 60 or 62. In the exemplary embodiment shown, one stabilizing tab 64 extends from the body 52 in a first direction and the other stabilizing tab 64 extends from the body 52 in a second direction that is opposite the first direction. However, the present disclosure contemplates that the stabilizing tabs 64 extend from the body 52 in the same direction.

Continuing to refer to FIGS. 8-10, the bottom edge 54 of the body 52 is provided with at least one and preferably two spaced-apart coupling tabs 66. The coupling tabs 66 extend substantially perpendicular to the plane of the body 52 and are configured for mating with the clip mounting apertures 46 in the conduit mounting portion 30 of the support plate 10, as shown in FIG. 8. Each coupling tab 66 has a first leg 68 that extends substantially parallel to the body 52 away from the bottom edge 54, and a second leg 70 extending substantially perpendicular to the first leg 68. The second leg 70 of the coupling tab 66 has a projecting hook 72 spaced from the body 52. The first leg 68 has a length sufficient to space the second leg 70 of the coupling tab 66 a distance sufficient so that the coupling tab 66 can extend through the mounting aperture 46 in the support plate 10, seen in FIG. 8, and the projecting hook 72 can hook onto the inner surface of a wall around an edge of the respective mounting aperture 46. The projecting hook 72 forms a bar or barb or other retainer member that couples the hanger clip 50 to the support plate 10. A more detailed description of the hanger clip 50 and its operation can be found in commonly owned U.S. Pat. No. 9,337,635 which is incorporated herein in its entirety by reference.

Figure 11:
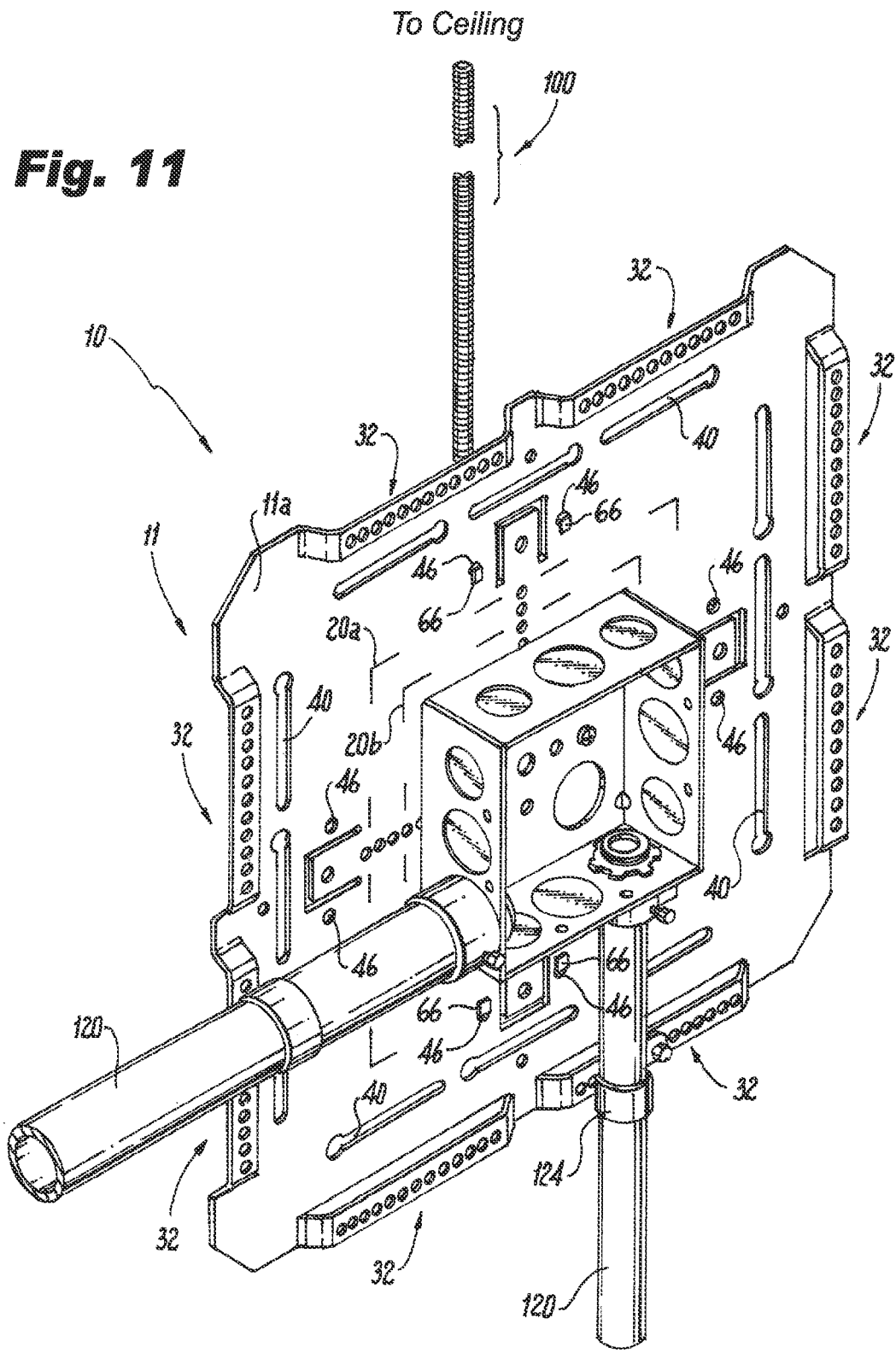
FIG. 11 is a perspective view of the front face of the electrical box and conduit support plate of FIG. 2, illustrating the electrical box and conduit support plate suspended from a ceiling in a vertical orientation using a threaded rod and hanger clips of FIG. 9, with an electrical junction box attached to the electrical box and conduit support plate and electrical conduits connected to the electrical junction box and secured to built-in offsets of the electrical box and conduit support plate using a conduit strap.
Figure 12:
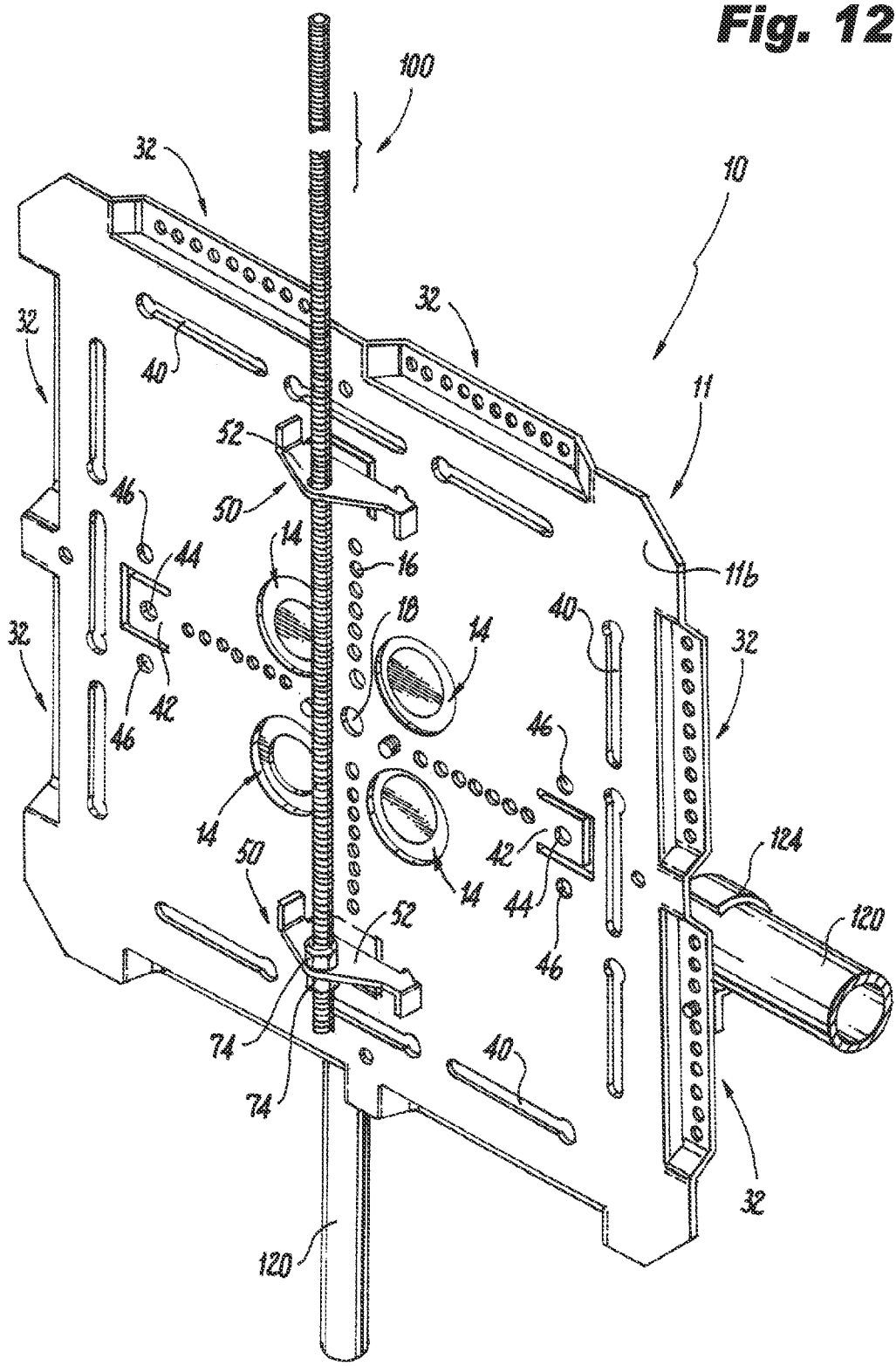
FIG. 12 is a perspective view of the rear face of the electrical box and conduit support plate of FIG. 11 suspended from a ceiling in a vertical orientation using the threaded rod and the hanger clips.

Referring now to FIGS. 11 and 12, an exemplary embodiment of the support plate 10, box 110 and multiple conduits 120 are shown with the support plate 10 in a vertical orientation. In this embodiment, two hanger clips 50 are coupled to the support plate 10 in a manner described above and the hanging member 100 is a threaded rod that passes through the center apertures 56 in the hanger clips 50 and is secured to the hanger clip using nuts 74, as shown.

Figure 13:
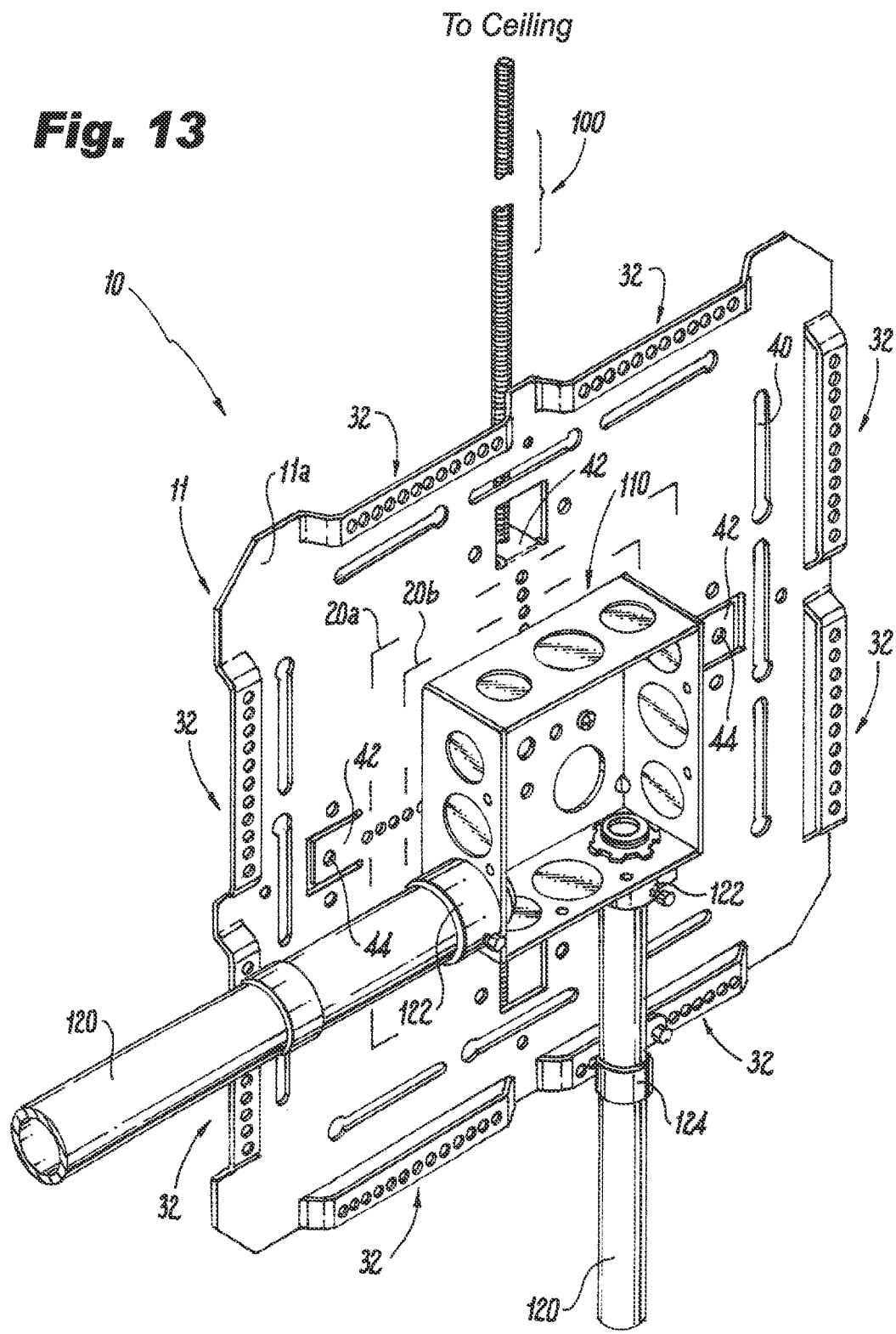
FIG. 13 is a perspective view of a front face of the electrical box and conduit support plate of FIG. 2, illustrating the electrical box and conduit support plate suspended from a ceiling in a vertical orientation using a threaded rod and hanger tabs built into the electrical box and conduit support plate, with an electrical junction box attached to the electrical box and conduit support plate and electrical conduits connected to the electrical junction box and secured to built-in offsets of the electrical box and conduit support plate using conduit straps.
Figure 14:
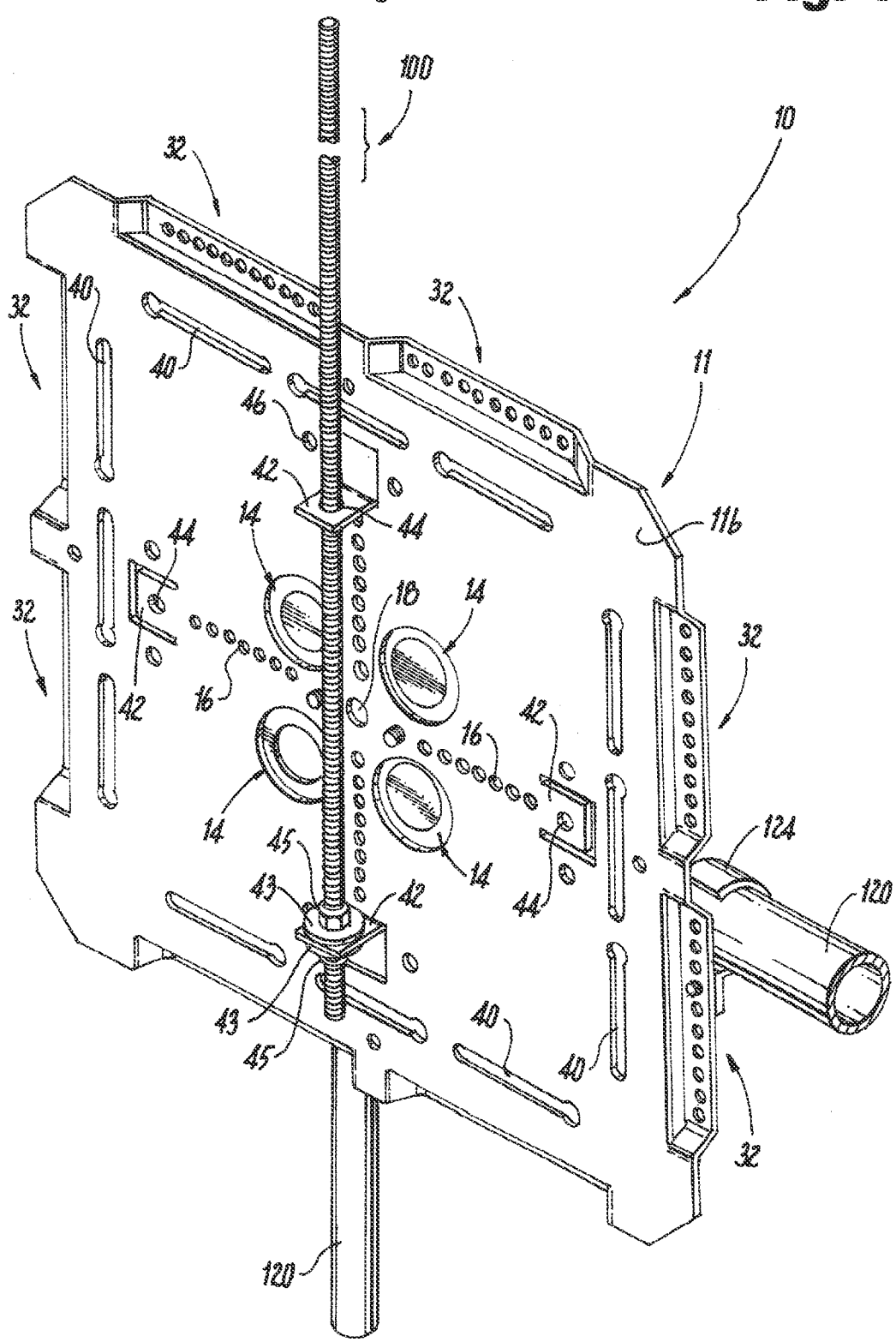
FIG. 14 is a perspective view of the rear face of the electrical box and conduit support plate of FIG. 13 suspended from a ceiling in a vertical orientation using the threaded rod and the built in hanger tabs.

Referring to FIGS. 13 and 14, an exemplary embodiment of the support plate 10, box 110 and multiple conduits 120 are shown with the support plate 10 in a vertical orientation. In this embodiment, the hanging member 100 is a threaded rod that passes through the center apertures 44 in the built-in hanger tabs 42 that are bent away from the rear face 11b of the body 11 of the support plate 10 so that the hanger tabs are substantially perpendicular to the support plate, as shown. The threaded rod 100 is then secured to the hanger tabs 42 using washers 43 and nuts 45, as shown.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical box and conduit support plate comprising:
   a body having a front face, a rear face, a box mounting portion and a conduit mounting portion; and
   a plurality of offsets, each of the plurality of offsets is formed in a portion of the conduit mounting portion starting at a perimeter edge of the conduit mounting portion, each of the plurality of offsets includes at least two walls extending from the body and a substantially flat arm extending between the at least two walls such that the arm is spaced away from the body.

2. The electrical box and conduit support plate according to claim 1, further comprising a plurality of hanger tabs positioned in the conduit mounting portion of the body, each of the plurality of hanger tabs being bendable relative to the body.

3. The electrical box and conduit support plate according to claim 1, further comprising at least one pair of clip mounting apertures positioned in the conduit mounting portion of the body.

4. The electrical box and conduit support plate according to claim 3, further comprising at least one hanger clip coupled to the at least one pair of clip mounting apertures.

5. The electrical box and conduit support plate according to claim 1, wherein the at least two walls includes a first side wall and a second side wall.

6. The electrical box and conduit support plate according to claim 1, wherein the at least two walls extend substantially perpendicular from the conduit mounting portion.

7. The electrical box and conduit support plate according to claim 1, wherein the at least two walls extend at an angle relative to the conduit mounting portion.

8. The electrical box and conduit support plate according to claim 1, wherein the arm includes a plurality of clamp mounting apertures.

9. An electrical box and conduit support plate comprising:
a body having a front face, a rear face, a box mounting portion and a conduit mounting portion;
a plurality of offsets, each of the plurality of offsets is formed in a portion of the conduit mounting portion starting at a perimeter edge of the conduit mounting portion, each of the plurality of offsets includes at least two walls extending from the body and a substantially flat arm extending between the at least two walls such that the arm is spaced away from the body; and
at least one pair of clip mounting apertures positioned in the conduit mounting portion of the body.

10. The electrical box and conduit support plate according to claim 9, further comprising a plurality of hanger tabs positioned in the conduit mounting portion of the body, each of the plurality of hanger tabs being bendable relative to the body.

11. The electrical box and conduit support plate according to claim 9, further comprising at least one hanger clip coupled to the at least one pair of clip mounting apertures.

12. The electrical box and conduit support plate according to claim 9, wherein the at least two walls includes a first side wall and a second side wall.

13. The electrical box and conduit support plate according to claim 9, wherein the at least two walls extend substantially perpendicular from the conduit mounting portion.

14. The electrical box and conduit support plate according to claim 9, wherein the at least two walls extend at an angle relative to the conduit mounting portion.

15. The electrical box and conduit support plate according to claim 9, wherein the arm includes a plurality of clamp mounting apertures.

16. A box and conduit support kit comprising:
an electrical box and conduit support plate including:
a body having a front face, a rear face, a box mounting portion and a conduit mounting portion;
a plurality of offsets, each of the plurality of offsets is formed in a portion of the conduit mounting portion starting at a perimeter edge of the conduit mounting portion, each of the plurality of offsets includes at least two walls extending from the body and a substantially flat arm extending between the at least two walls such that the arm is spaced away from the body; and
at least one pair of clip mounting apertures positioned in the conduit mounting portion of the body; and
at least one hanger clip coupled to the at least one pair of clip mounting apertures.

17. The box and conduit support kit according to claim 16, further comprising a plurality of hanger tabs positioned in the conduit mounting portion of the body, each of the plurality of hanger tabs being bendable relative to the body.

18. The box and conduit support kit according to claim 16, wherein the at least one hanger clip includes:
a body having a first side and a second side;
at least one stabilizing tab extending from either the first side or the second side; and
at least one pair of coupling tabs extending from a bottom edge of the body, the at least one pair of coupling tabs being configured to couple with the at least one pair of clip mounting apertures.

19. The box and conduit support kit according to claim 16, wherein the at least two walls includes a first side wall and a second side wall.

20. The box and conduit support kit according to claim 16, wherein the at least two walls extend substantially perpendicular from the conduit mounting portion.

21. The box and conduit support kit according to claim 16, wherein the at least two walls extend at an angle relative to the conduit mounting portion.

22. The box and conduit support kit according to claim 16, wherein the arm includes a plurality of clamp mounting apertures.

* * * * *